US012660754B2

(12) United States Patent
Li et al.

(10) Patent No.: US 12,660,754 B2
(45) Date of Patent: Jun. 23, 2026

(54) PLUM PICKING AND GRADING ROBOT AND PICKING METHOD

(71) Applicant: Xinjiang University, Urumqi City (CN)

(72) Inventors: Xiaojuan Li, Urumqi City (CN); Dongxu Wang, Urumqi City (CN); Xiangjun Zou, Urumqi City (CN); Hong Jiang, Urumqi City (CN); Chao Wang, Urumqi City (CN); Mingming Xiong, Urumqi City (CN); Hui Zhang, Urumqi City (CN); Jundong Wang, Urumqi City (CN); Haining Wang, Urumqi City (CN); He Zhang, Urumqi City (CN)

(73) Assignee: Xinjiang University, Urumqi City (CN)

( * ) Notice: Subject to any disclaimer, the term of this patent is extended or adjusted under 35 U.S.C. 154(b) by 0 days.

(21) Appl. No.: 19/284,994

(22) Filed: Jul. 30, 2025

(65) Prior Publication Data

US 2026/0033429 A1      Feb. 5, 2026

(30) Foreign Application Priority Data

Jul. 30, 2024    (CN) .......................... 202411028235.1

(51) Int. Cl.
*A01D 46/30*          (2006.01)
(52) U.S. Cl.
CPC .................................... *A01D 46/30* (2013.01)
(58) Field of Classification Search
CPC .................................................... A01D 46/30
See application file for complete search history.

(56) References Cited

FOREIGN PATENT DOCUMENTS

| | | | | | |
|---|---|---|---|---|---|
| CN | 105409452 A | * | 3/2016 | ............. | A01D 46/30 |
| CN | 206237837 U | * | 6/2017 | | |
| CN | 108076832 A | * | 5/2018 | ............. | B07C 5/24 |
| CN | 106105566 B | * | 7/2018 | ............. | A01D 46/30 |
| CN | 109156161 A | * | 1/2019 | ........... | F16F 15/023 |
| CN | 109156165 A | * | 1/2019 | ........... | B65B 25/046 |
| CN | 109258108 A | * | 1/2019 | ............. | A01D 46/30 |

(Continued)

OTHER PUBLICATIONS

CN 109845491 A (Year: 2019).*
CN 111758396 A (Year: 2020).*

*Primary Examiner* — Joseph M Rocca
*Assistant Examiner* — Madeline I Runco
(74) *Attorney, Agent, or Firm* — Ballard Spahr LLP

(57)          ABSTRACT

Provided is a plum picking and grading robot. The plum picking and grading robot includes a base supporting mechanism, a collecting box body, a grading and screening mechanism, a picking robotic arm, an end execution mechanism, a storage mechanism, and a visual identification system, where the collecting box body is disposed at a front end of the base supporting mechanism, and includes a sound fruit collecting box and a defective fruit collecting box; the grading and screening mechanism and the picking robotic arm are separately disposed on an end surface of the base supporting mechanism, and the end execution mechanism is disposed on an end that is of the picking robotic arm and that is away from the base supporting mechanism; the storage mechanism is disposed on the end surface of the base supporting mechanism; and the visual identification system includes one positioning binocular camera and two identifying binocular cameras.

10 Claims, 4 Drawing Sheets

(56)        References Cited

FOREIGN PATENT DOCUMENTS

| | | | | | |
|---|---|---|---|---|---|
| CN | 109845491 | A | * | 6/2019 | |
| CN | 111758396 | A | * | 10/2020 | ........... H04N 23/695 |
| CN | 112790007 | A | * | 5/2021 | ............... B07B 1/28 |
| CN | 115316129 | A | * | 11/2022 | ............. A01D 46/30 |
| CN | 115623922 | A | * | 1/2023 | ............. A01D 46/30 |
| CN | 113843810 | B | * | 5/2023 | ............. A01D 46/30 |
| CN | 116250424 | A | * | 6/2023 | ............. A01D 46/30 |
| CN | 116267229 | A | * | 6/2023 | ............. A01D 46/30 |
| CN | 116569740 | A | * | 8/2023 | ............. A01D 46/30 |
| CN | 111758397 | B | * | 12/2023 | ............. A01D 46/30 |

* cited by examiner

PLUM PICKING AND GRADING ROBOT AND PICKING METHOD

CROSS REFERENCE TO RELATED APPLICATION

This patent application claims the benefit and priority of Chinese Patent Application No. 202411028235.1, filed with the China National Intellectual Property Administration on Jul. 30, 2024, the disclosure of which is incorporated by reference herein in its entirety as part of the present application.

TECHNICAL FIELD

The present disclosure relates to the field of fruit picking technologies, and in particular, relates to a plum picking and grading robot and a picking method.

BACKGROUND

Plums are a fruit rich in nutrients and with a unique flavor. Plums, known as a third-generation functional fruit, are rich in vitamins A, B, and C that are essential for an immune function and metabolism as well as minerals such as calcium, iron, zinc, and potassium that are helpful for bone health, blood circulation, and cellular function.

Currently, the Kashgar region in Xinjiang Uygur Autonomous Region is one of China's primary production bases and distribution hubs for plum cultivation resources and fruits. Due to a significant variation in plum ripening periods and stringent quality requirements on fruits during picking, plum picking remains predominantly dependent on manual selective picking. This picking manner is labor-intensive, inefficient, and costly; and a high demand for professional experience of a picker often leads to missing an optimal harvest window, significantly compromising both yield and fruit quality of plum. With spread of mechanized and automated agriculture, robots are gradually adopted in some regions to pick plum, thereby significantly reducing labor costs and labor intensity, and improving the picking effect. However, due to distinctive characteristics (significant variation in fruit ripening periods) and tissue delicacy of plums, most of existing plum picking robots have disadvantages such as structural complexity, high picking costs, susceptibility to fruit damage during picking, and demand for manual separating as picking and sorting cannot be simultaneously completed. Therefore, plum picking efficiency still cannot be maximized, and a fruit rejection rate is likely to be increased during picking.

SUMMARY

To resolve the problems in the conventional technology, an objective of the present disclosure is to provide a plum picking and grading robot. The robot can be configured to implement automatic picking and sorting in a plum picking process, thereby effectively improving picking efficiency and avoiding an excessive screening step before and after the picking. In addition, the robot can be configured to effectively protect plums in the picking process, thereby avoiding plum damage caused by picking, and ensuring fruit quality while improving picking efficiency.

Another objective of the present disclosure is to provide a picking method of the plum picking and grading robot.

A plum picking and grading robot includes a base supporting mechanism, a collecting box body, a grading and screening mechanism, a picking robotic arm, an end execution mechanism, a storage mechanism, and a visual identification system, where the collecting box body is disposed at a front end of the base supporting mechanism, and includes a sound fruit collecting box and a defective fruit collecting box; the grading and screening mechanism and the picking robotic arm are separately disposed on an end surface of the base supporting mechanism; the end execution mechanism is disposed on an end that is of the picking robotic arm and that is away from the base supporting mechanism; the storage mechanism is disposed on the end surface of the base supporting mechanism, and the storage mechanism is separately connected to the end execution mechanism and the grading and screening mechanism; and the visual identification system includes one positioning binocular camera and two identifying binocular cameras, where the one positioning binocular camera is disposed on the end execution mechanism, and the two identifying binocular cameras corresponding to the grading and screening mechanism are disposed on the end surface of the base supporting mechanism.

Based on further optimization of the solution, the base supporting mechanism includes a chassis, supporting studs, a connecting plate, crawler wheels, and tracks, where a plurality of vertical supporting studs that are uniformly distributed are disposed on an end surface of the chassis, an end that is of the supporting stud and that is away from the chassis is connected to the same connecting plate, two crawler wheels are disposed on a side surface of each of two sides of the chassis, and the two crawler wheels on a same side are connected to each other through the track; and the defective fruit collecting box is disposed between the chassis and the connecting plate, and the sound fruit collecting box is disposed at a front end of the chassis, and the sound fruit collecting box is fixedly connected to the defective fruit collecting box.

Based on further optimization of the solution, the grading and screening mechanism includes a circular screening disc, a first baffle plate, a first slideway, a second baffle plate, a defective fruit slideway, a sound fruit slideway, and a second slideway, where the circular screening disc is fixedly disposed on an end surface of the connecting plate, and the circular screening disc is a tapered structure that has a large diameter on an upper part and a small diameter on a lower part; a coaxial rotating shaft is disposed in a middle of the circular screening disc, the first baffle plate is disposed on an outer wall of the rotating shaft, and the first baffle plate is rotated in the circular screening disc through the rotating shaft; a discharge outlet is provided on a side surface that is of the circular screening disc and that is close to the sound fruit collecting box, the first slideway is disposed at the discharge outlet, and the first slideway is an inclined rail structure that is inclined to the sound fruit collecting box from the circular screening disc; an end that is of the first slideway and that is away from the circular screening disc is connected to the sound fruit slideway, and the defective fruit slideway is disposed on a side surface of the end that is of the first slideway and that is away from the circular screening disc, the second baffle plate is rotatably disposed on a joint of the sound fruit slideway and the defective fruit slideway, the connecting plate is provided with a blanking hole on an end that is of the defective fruit slideway and that is away from the first slideway, and the blanking hole corresponds to the defective fruit collecting box; and an end that is of the sound fruit slideway and that is away from the first slideway is connected to the second slideway disposed in the sound fruit collecting box.

Based on further optimization of the solution, the end execution mechanism includes a fixed box body, a drive motor, a first gear, a second gear, a first rack, a first protective ring, a second rack, a squeezing plate, and a second protective ring, where the fixed box body is disposed at the end that is of the picking robotic arm and that is away from the base supporting mechanism, the drive motor is disposed on a bottom of an inner cavity of the fixed box body, a gear shaft is coaxially disposed on an output shaft of the drive motor, and an end that is of the gear shaft and that is away from the drive motor is rotatably connected to a top surface of the inner cavity of the fixed box body; the first gear and the second gear are sequentially sleeved on an outer wall of the gear shaft from bottom to top, an inner wall of one side of the fixed box body is slidably provided with the first rack corresponding to the first gear, the first protective ring is disposed on an end that is of the first rack and that is away from the picking robotic arm through a slidable supporting base, an end that is of the first protective ring and that is away from the first rack penetrates and is slidably connected to a corresponding side wall of the fixed box body, a separating block is disposed on a top surface of an end that is of the first protective ring and that is away from the fixed box body, and a separating groove with a separating blade is provided in a side surface of a side that is of the separating block and that is close to the fixed box body; an inner wall of the other side of the fixed box body is slidably provided with the second rack corresponding to the second gear (namely, an inner wall of a side opposite to the first rack), an end that is of the second rack and that is close to the first protective ring penetrates a corresponding side wall of the fixed box body, and is provided with the squeezing plate, and a side wall of a side that is of the squeezing plate and that is close to the separating block is provided with an ejector block corresponding to the separating groove; and an outer wall of the fixed box body is fixedly provided with the second protective ring on a lower side of the first protective ring, and the second protective ring and the first protective ring are disposed in parallel.

To ensure smooth cutting of the end execution mechanism, based on further optimization of the solution, a limiting rod is disposed on a side surface of a side that is of the squeezing plate and that is away from the ejector block, and is located on a side of the first rack, the limiting rod penetrates a corresponding side wall of the fixed box body, and a limiting block is disposed on a side that is of the limiting rod and that is away from the squeezing plate.

Based on further optimization of the solution, the first protective ring and the second protective ring each comprises an inner ring and an outer ring, where the inner ring is made of plastic, and the outer ring is made of a biopolymer material.

Based on further optimization of the solution, the storage mechanism includes a connecting hose, a cushioning mechanism, a transition collecting box, and a guide chute, where the transition collecting box is fixedly disposed on the end surface of the base supporting mechanism and is located on a side of the circular screening disc, a distance between a bottom surface of the transition collecting box and the end surface of the base supporting mechanism is greater than a distance between a top surface of the circular screening disc and the end surface of the base supporting mechanism (that is, a height of the transition collecting box is greater than that of the circular screening disc), one end of the connecting hose is disposed on a bottom surface of the second protective ring, and is communicated with an inner ring of the second protective ring, the other end of the connecting hose is communicated with a side surface of a side of the transition collecting box, and the cushioning mechanism (for example, rubber bosses that are uniformly distributed are configured to perform cushioning) is disposed on a joint of the connecting hose and the transition collecting box; and the guide chute is provided on a side surface of a side that is of the transition collecting box and that is close to the circular screening disc, and the guide chute is an inclined chute that is inclined to the circular screening disc from the transition collecting box.

Based on further optimization of the solution, the bottom surface of the inner cavity of the transition collecting box is set to an inclined surface structure (a degree of inclination of the inclined surface structure is consistent with that of the guide chute) that is inclined to the circular screening disc from the transition collecting box, and a sponge cushioning layer is uniformly paved on an inner cavity wall of the transition collecting box.

A picking method using the plum picking and grading robot comprises the following steps:

step S1, identifying and positioning: performing scanning by one positioning binocular camera in a horizontal orientation at a long-range point relative to a plum to obtain a distant plum image, and performing segmentation and target identification on the distant plum image;

step S2, plum cluster selecting: adopting a target tracking algorithm to track target plums and identifying a quantity of mature plums; and when a quantity of mature plums in a cluster exceeds 60% of a total quantity of fruits in the cluster, designating the cluster as a target plum cluster;

step S3, picking point positioning: selecting a position of a bottommost plum of the target plum cluster as a picking point reference position, and downward moving, along a bottommost end of the picking point reference position, 3 cm to 5 cm in a longitudinal direction of the bottommost plum, to obtain a picking point;

step S4, fruit picking: gradually moving a picking robotic arm according to the picking point, to complete further identifying and positioning of the plum at a close range; after an end execution mechanism reaches the picking point, obtaining a relative distance between the picking point and an upper edge of the plum (namely, an apex of the plum), and then longitudinally increasing the relative distance by 3 cm to 5 cm, to obtain an end point of the end execution mechanism; and moving, according to the picking point and the end point, the end execution mechanism from bottom to top to implement enveloping and cutting separation of the plum, thereby completing picking; and step S5, fruit screening and collecting: dropping picked fruits into a grading and screening mechanism from the storage mechanism, separating sound fruits from defective fruits after screening via a grading and screening mechanism, and respectively collecting the sound fruits and the defective fruits in a sound fruit collecting box and a defective fruit collecting box.

Based on further optimization of the solution, the step S1 specifically includes:

step S11, first, calculating a histogram of an input image to obtain frequency distribution of each pixel value in the input image; sampling a target image, equally dividing a histogram interval of the target image into M equal subintervals, and setting a width of each subinterval to U; and mapping an image gray value to each subinterval and calculating a pixel frequency within each subinterval;

step S12, first, calculating grayscale distribution of all pixel values within each subinterval to obtain a grayscale mean within each subinterval, and calculating a within-class variance of each subinterval, where the within-class variance indicates pixel value dispersion in the subinterval; and scanning all possible thresholds, calculating a within-class variance corresponding to each threshold, and selecting a threshold that maximizes a within-class variance as an optimal threshold;

step S13, dividing, according to the optimal threshold, an image into two regions: a foreground and a background, where a region in which a pixel value is greater than the optimal threshold is the foreground, and a region in which a pixel value is less than the optimal threshold is the background, to segment the target image from the background; and step S14, optimizing the segmented image by using grayscale morphology to implement image segmentation and identification, and dividing and positioning subintervals of the segmented image.

Based on further optimization of the solution, the step S2 of adopting a target tracking algorithm to track target plums and identifying a quantity of mature plums specifically includes:

step S21, first, detecting a candidate target from a video frame through target detection, and obtaining a bounding box and a confidence score of each candidate target; and then grouping, according to correlation between time and space, detected candidate targets, and measuring a degree of overlap between two candidate targets;

step S22, matching a detection result of a current frame with a trajectory of a previous frame, and obtaining a minimal-cost matching method by using a Hungarian algorithm, and performing calculation based on cost including a distance, a speed, and a confidence, to complete primary matching; and performing secondary matching between a candidate target that is not matched with a previous trajectory and a trajectory closest to the candidate target;

step S23, generating a new trajectory according to a matching result, where each generated trajectory includes a series of bounding boxes and corresponding confidence scores; and predicting a position of a trajectory for a next frame via a Kalman filter, and correcting the predicted trajectory according to a new detection result; and step S24, presetting a confidence score threshold range, comparing the confidence score in the trajectory with the confidence score threshold range to implement fruit separating based on fruit maturity, where a proximity to a lower limit of the confidence score threshold range indicates a higher maturity, and a proximity to an upper limit of the confidence score threshold range indicates a lower maturity; and screening trajectories according to trajectory lengths and confidence scores to remove unstable and unreasonable trajectories, to obtain a quantity of fruits.

Based on further optimization of the solution, the confidence score threshold range is [0, 1].

Based on further optimization of the solution, a method of obtaining the position of the bottommost plum in step S3 specifically includes:

first, obtaining images from different perspectives through image acquisition in a plurality of perspectives; then, extracting feature points from two or more images to search for a feature point pair corresponding to a same target point (namely, the bottommost plum); and calculating three-dimensional point cloud through triangulation for each matched feature point pair, to obtain spatial coordinates of the target point, where a depth d from triangulation is as follows:

$$d = \frac{f \cdot b}{\tan \alpha}$$

where, f indicates a camera focal length, b indicates a distance between images in different perspectives, and α indicates an angle between images in different perspectives.

Based on further optimization of the solution, completing the further identifying and positioning of the plum at the close range in step S4 specifically includes the following steps:

first, obtaining an optimal classification hyperplane by using a support vector machine (SVM) algorithm, establishing a model, and defining a hyperplane linear equation for dividing sample data into two classes, $$W^T \cdot X + b = 0$$

where, w indicates a weight vector; X indicates a hyperplane, where sample data points are perpendicular to the hyperplane X; and b indicates a bias item for determining a distance between the hyperplane and an origin;

then, obtaining the weight vector w and the bias term b of the hyperplane linear equation by resolving using a Lagrangian multiplier method;

then, selecting any two variables through iteration to perform optimization, thereby implementing model optimization; and finally, classifying data by using the weight vector and the bias item, calculating a distance from a data point to the hyperplane, and determining the class according to a positive or negative value of the distance, where a classifying linear equation is as follows:

$$f(x) = \text{sign}(W^T \cdot X + b)$$

where, predicted class labels within the sign( ) function are −1 or 1.

Pixels in an image are determined by using a decision function, thereby achieving image segmentation and target identification/positioning.

Based on further optimization of the solution, a method of obtaining the upper edge of the plum (namely, the apex of the plum) in step S4 specifically includes:

first, obtaining two-dimensional coordinates (u, v) of a corresponding feature point in the image and depth information D of the two-dimensional coordinates, and calculating to obtain three-dimensional coordinates of the feature point:

$$\begin{cases} X = \dfrac{(u - c_x) \cdot D}{f_x} \\ Y = \dfrac{(v - c_y) \cdot D}{f_y} \\ Z = D \end{cases}$$

where, fx and fy indicate camera focal lengths, and $c_x$ and $c_y$ indicate coordinates of a camera principal point.

Based on further optimization of the solution, a discriminative method for screening plums via the grading and screening mechanism in step S5 includes the following steps:

step S51, collecting data: collecting a dataset including various plum images and corresponding labels, where the dataset includes different task labels including fruit size, presence or absence of cracks, presence or absence of damage, presence or absence of stems, and the like;

step S52, setting the fruit size as a regression problem, with labels representing sizes of plums: obtaining maximum longitudinal and horizontal diameters of fruits by calculating a minimum bounding rectangle of fruit images, comparing the maximum longitudinal and horizontal diameters with average data (the average data is obtained through massive experimental data) to determine whether the fruit sizes meet standards; setting the presence or absence of cracks as a secondary classification problem with labels: crack-present=1 and crack-absent=0; setting presence or absence of damage as a secondary classification problem with labels: damage-present=1 and damage-absent=0; and setting presence or absence of stems as a secondary classification problem with labels: stem-present=1 and stem-absent=0;

step S53, performing model design: using a ResNet neural network model as a screening model, selecting first four ResNet Blocks of the ResNet neural network model as a shared convolutional layer to extract features of an input image; setting a plurality of task-specific branches after the shared convolutional layer, where each branch is used to process a specific task, each task-specific branch includes several convolutional layers and a fully connected layer for optimizing different tasks;

step S54, training the screening model by using the dataset including a plurality of task labels, where a corresponding label is provided for each task in a training process; and step S55, evaluating performance of the screening model by using a validation set after training the screening model, to complete training.

The following provides the technical effects achieved by the solution of the present disclosure.

According to this application, the end execution mechanism including the fixed box body, the drive motor, the first gear, the second gear, the first rack, the first protective ring, the second rack, the squeezing plate, and the second protective ring is used to envelope fruits from bottom to top and achieve a cut-through picking mode. In this way, a single target fruit is accurately grabbed by separating target fruits from non-target fruits, so that picking efficiency is improved; the end execution mechanism is prevented from damaging the non-target fruits in a picking process, so that the non-target fruits are located outside a picking region, and overall quality of fruits of a same cluster is ensured; impact of an ambient environment on the target fruits can be avoided in the picking process, so that stable and damage-free fruit picking is implemented, fruit damage due to deviation in the picking process is avoided, and integrity and quality of fruits is ensured; and overall flexibility of the end execution mechanism is ensured to avoid problems such as missed picking and false picking as precision in locating and picking processes is affected due to impact on a fruit cluster in a moving process of the end execution mechanism. The grading and screening mechanism including the circular screening disc, the first baffle plate, the first slideway, the second baffle plate, the defective fruit slideway, the sound fruit slideway, and the second slideway cooperates with the end execution mechanism to screen fruits while picking the fruits, so that problems such as manual screening after picking are avoided, and fruit damage caused in a subsequent screening process is also avoided while efficiency is improved; and a three-level screening system is adopted by the grading and screening mechanism to identify and screen qualified fruits and unqualified products, so that a problem that overall quality is affected as the defective fruits are mixed in the sound fruits can be effectively avoided.

In addition, according to this application, an optimal working path is set according to growth characteristics of plums by coordinating a method integrating long-range identifying and positioning with target tracking and short-range identifying and positioning. The entire method is good in accuracy, high in stability, and can effectively save working time and improve picking working efficiency. Through coordination with a structural design of the end execution mechanism, damage to plums and fruits around is avoided while the plums are efficiently picked, so that problems such as false picking and missed picking are avoided, and automatic identifying and detecting level of fruits is remarkably improved. In addition, the fruits are screened by comprehensively covering data, precisely labeling, optimizing a model structure, synchronously training, and performing performance verification, so that the defective fruits and the sound fruits can be precisely and efficiently screened, and quality of picked fruits is ensured.

10—base supporting mechanism; 11—chassis; 12—supporting stud; 13—connecting plate; 130—blanking hole; 14—crawler wheel; 15—track; 21—sound fruit collecting box; 22—defective fruit collecting box; 31—circular screening disc; 32—first baffle plate; 33—first slideway; 34—second baffle plate; 35—defective fruit slideway; 36—sound fruit slideway; 37—second slideway; 40—picking robotic arm; 50—end execution mechanism; 51—fixed box body; 52—drive motor; 520—gear shaft; 53—first gear;

54—second gear; 55—first rack; 56—first protective ring; 561—separating block; 562—slidable supporting base; 57—second rack; 58—squeezing plate; 581—ejector block; 582—limiting rod; 59—second protective ring; 61—connecting hose; 62—transition collecting box; 63—guide chute; 71—positioning binocular camera; and 72—identifying binocular camera.

DETAILED DESCRIPTION OF THE EMBODIMENTS

The technical solutions in the embodiments of the present disclosure are described clearly and completely below with reference to the accompanying drawings in the embodiments of the present disclosure. Apparently, the described embodiments are merely some rather than all of the embodiments of the present disclosure.

Embodiment 1

Figure 1:
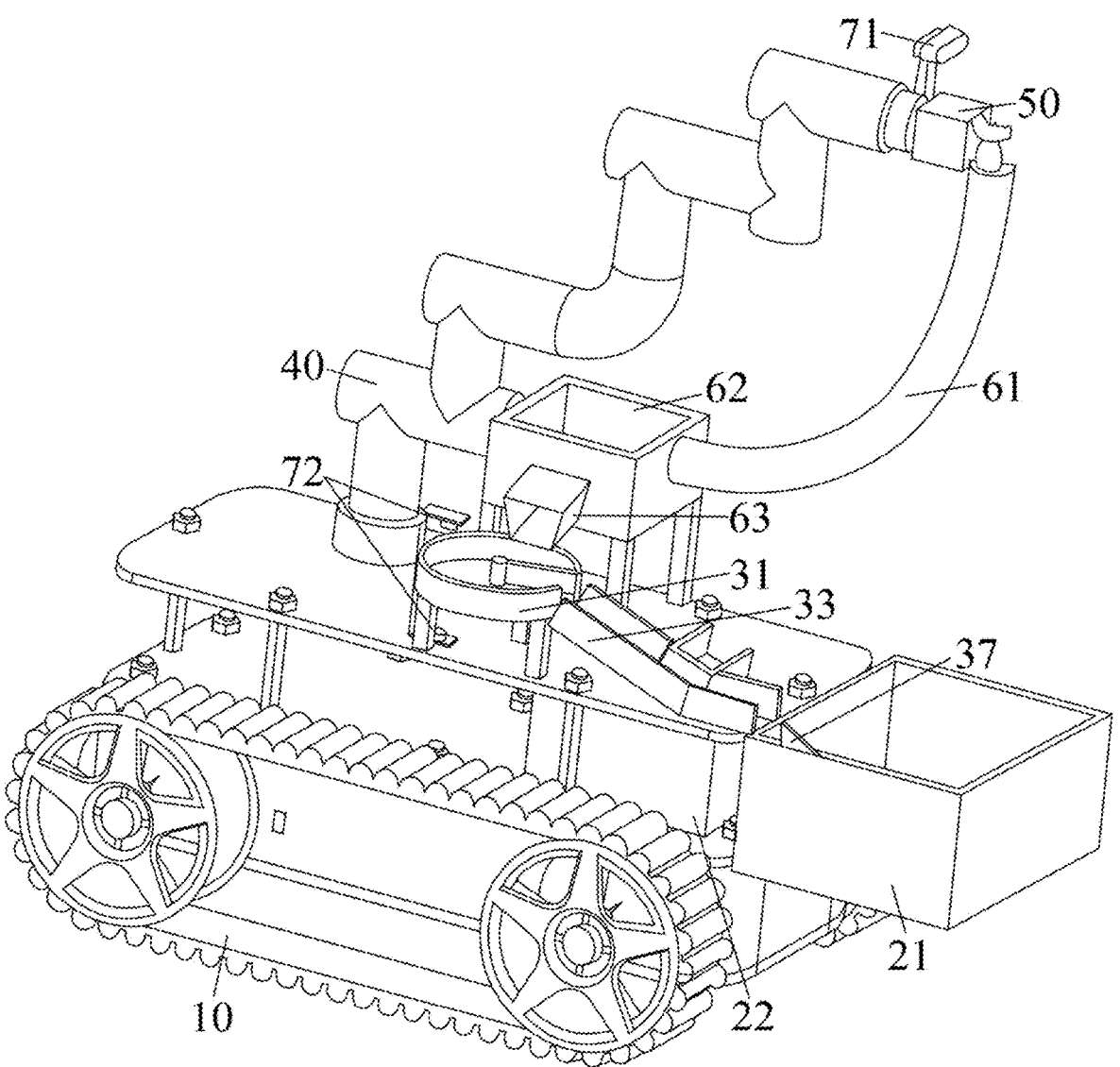
FIG. 1 is a schematic diagram of an overall structure of a picking and grading robot according to an embodiment of the present disclosure.
Figure 2:
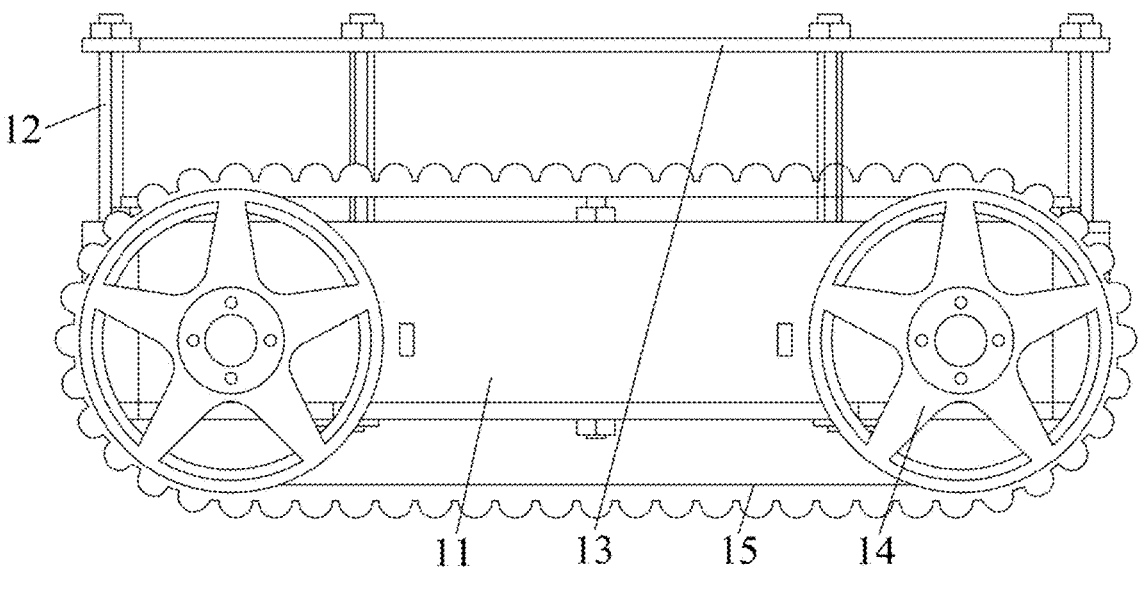
FIG. 2 is a schematic diagram of a structure of a base supporting mechanism of a picking and grading robot according to an embodiment of the present disclosure.

As shown in FIG. 1, a plum picking and grading robot includes a base supporting mechanism 10, a collecting box body, a grading and screening mechanism, a picking robotic arm 40, an end execution mechanism 50, a storage mechanism, and a visual identification system. As shown in FIG. 2, the base supporting mechanism 10 includes a chassis 11, a supporting stud 12, a connecting plate 13, a crawler wheel 14, and tracks 15. A plurality of vertical supporting studs 12 that are uniformly distributed (as shown in FIG. 1 and FIG. 2, a quantity of supporting studs 12 is set according to an actual condition, and eight supporting studs 12 are adopted in this embodiment) are disposed on an end surface of the chassis 11, an end that is of the supporting stud 12 and that is away from the chassis 11 is connected to the same connecting plate 13 (as shown in FIG. 2, the connecting plate 13 and the chassis 11 are disposed in parallel), two crawler wheels 14 are disposed on a side surface of each of two sides (namely front and rear sides as shown in FIG. 2) of the chassis 11, and the two crawler wheels 14 on a same side are connected to each other through the track 15. The collecting box body is disposed at a front end (namely, a right lower side as shown in FIG. 1) of the base supporting mechanism 10, and is located between the chassis 11 and the connecting plate 13 (as shown in FIG. 1 and FIG. 2), and includes a sound fruit collecting box 21 and a defective fruit collecting box 22. The defective fruit collecting box 22 is disposed between the chassis 11 and the connecting plate 13, and the sound fruit collecting box 21 is disposed at a front end of the chassis 11 and the sound fruit collecting box 21 is fixedly connected to the defective fruit collecting box 22.

Figure 3:
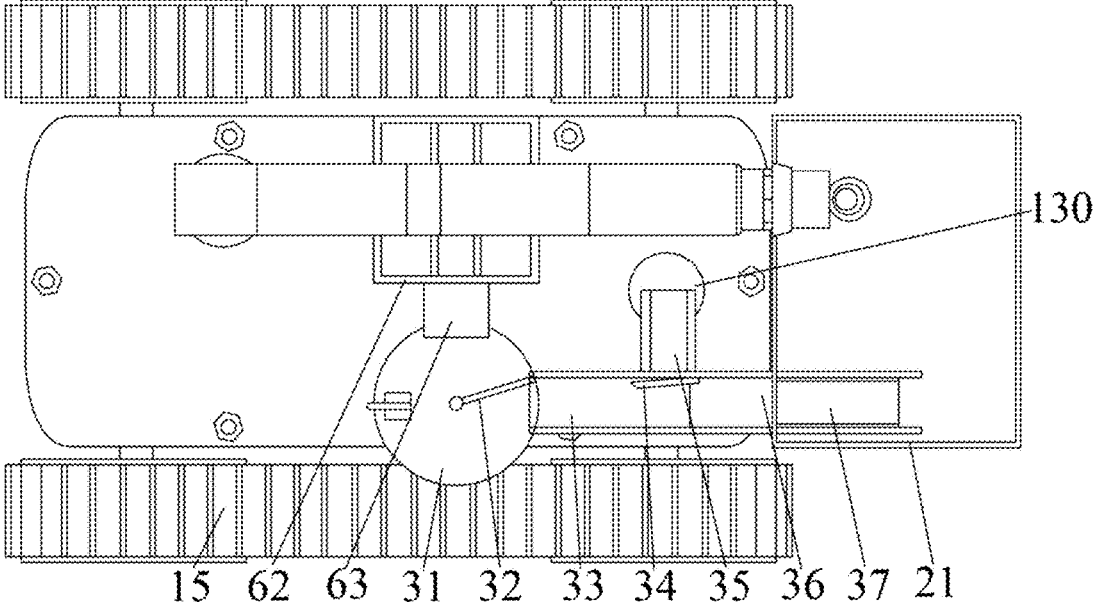
FIG. 3 is a top view of a picking and grading robot according to an embodiment of the present disclosure.

The grading and screening mechanism and the picking robotic arm 40 are separately disposed on the end surface of the base supporting mechanism (specifically, the connecting plate 13). As shown in FIG. 1 and FIG. 3, the grading and screening mechanism includes a circular screening disc 31, a first baffle plate 32, a first slideway 33, a second baffle plate 34, a defective fruit slideway 35, a sound fruit slideway 36, and a second slideway 37. The circular screening disc 31 is fixedly disposed on the end surface of the connecting plate 13 through a bracket, and the circular screening disc 31 is a tapered structure that has a large diameter on an upper part and a small diameter on a lower part (that, a longitudinal section of the circular screening disc is of an inverted isosceles trapezoid structure). A coaxial rotating shaft is disposed in a middle of the circular screening disc 31, the first baffle plate 32 is disposed on an outer wall of the rotating shaft, and the first baffle plate 32 is rotated in the circular screening disc 31 through the rotating shaft (the rotating shaft is driven by a motor disposed on a bottom of the circular screening disc 31 to drive the first baffle plate 32 to rotate around a center axis of the rotating shaft). A discharge outlet is provided on a side surface (namely, a right side as shown in FIG. 3) that is of the circular screening disc 31 and that is close to the sound fruit collecting box 21, the first slideway 33 is disposed at the discharge outlet, and the first slideway 33 is an inclined rail structure that is inclined to the sound fruit collecting box 21 from the circular screening disc 31 (namely, from the left side to the right side as shown in FIG. 3). An end that is of the first slideway 33 and that is away from the circular screening disc 31 is connected to the sound fruit slideway 36, and the defective fruit slideway 35 is disposed on a side surface of the end that is of the first slideway 33 and that is away from the circular screening disc 31 (as shown in FIG. 1 and FIG. 3). The second baffle plate 34 is rotatably disposed on a joint (an inner wall of a corner) of the sound fruit slideway 36 and the defective fruit slideway 35 (the second baffle plate 34 may be driven by a motor disposed on an outer wall of a slideway to rotate). The connecting plate 13 is provided with a blanking hole 130 on an end that is of the defective fruit slideway 35 and that is away from the first slideway 33, and the blanking hole 130 corresponds to the defective fruit collecting box 22. An end that is of the sound fruit slideway 36 and that is away from the first slideway 33 is connected to the second slideway 37 disposed in the sound fruit collecting box 21 (as shown in FIG. 1 and FIG. 3).

The picking robotic arm 40 is a common multi-axis robotic arm in the field, and usually has 3 axes to 6 axes. As shown in FIG. 1, a six-axis robotic arm is adopted in this embodiment.

Figure 4:
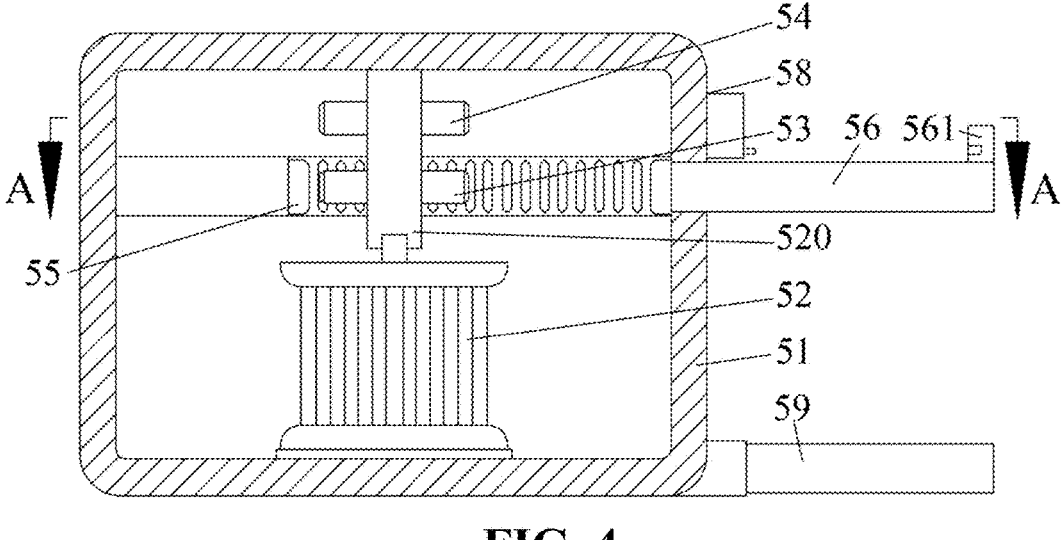
FIG. 4 is a schematic diagram of a structure of an end execution mechanism of a picking and grading robot according to an embodiment of the present disclosure.
Figure 5:
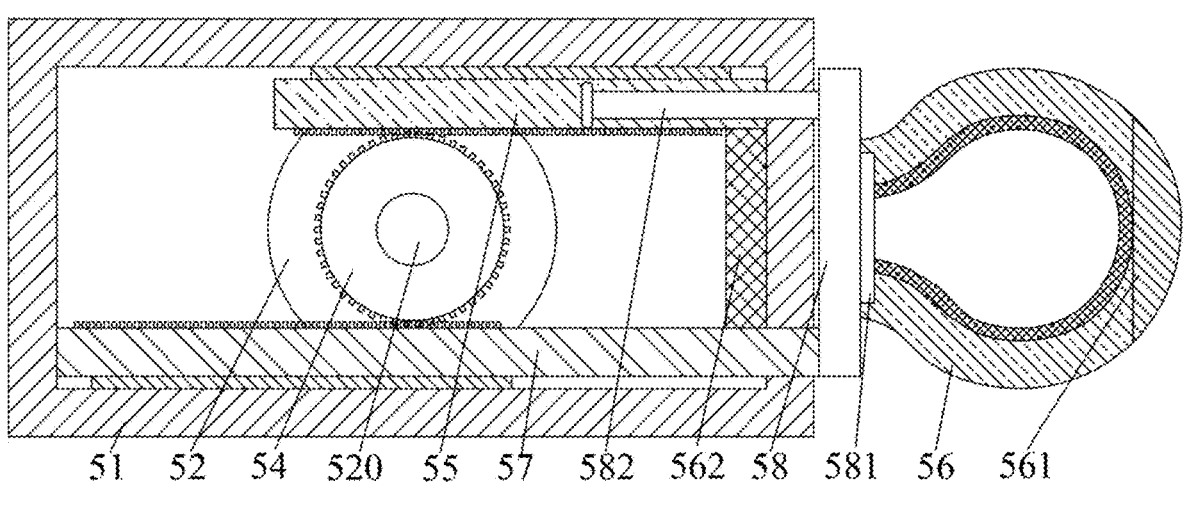
FIG. 5 is a sectional view along a direction A-A shown in FIG. 4.
Figure 6:
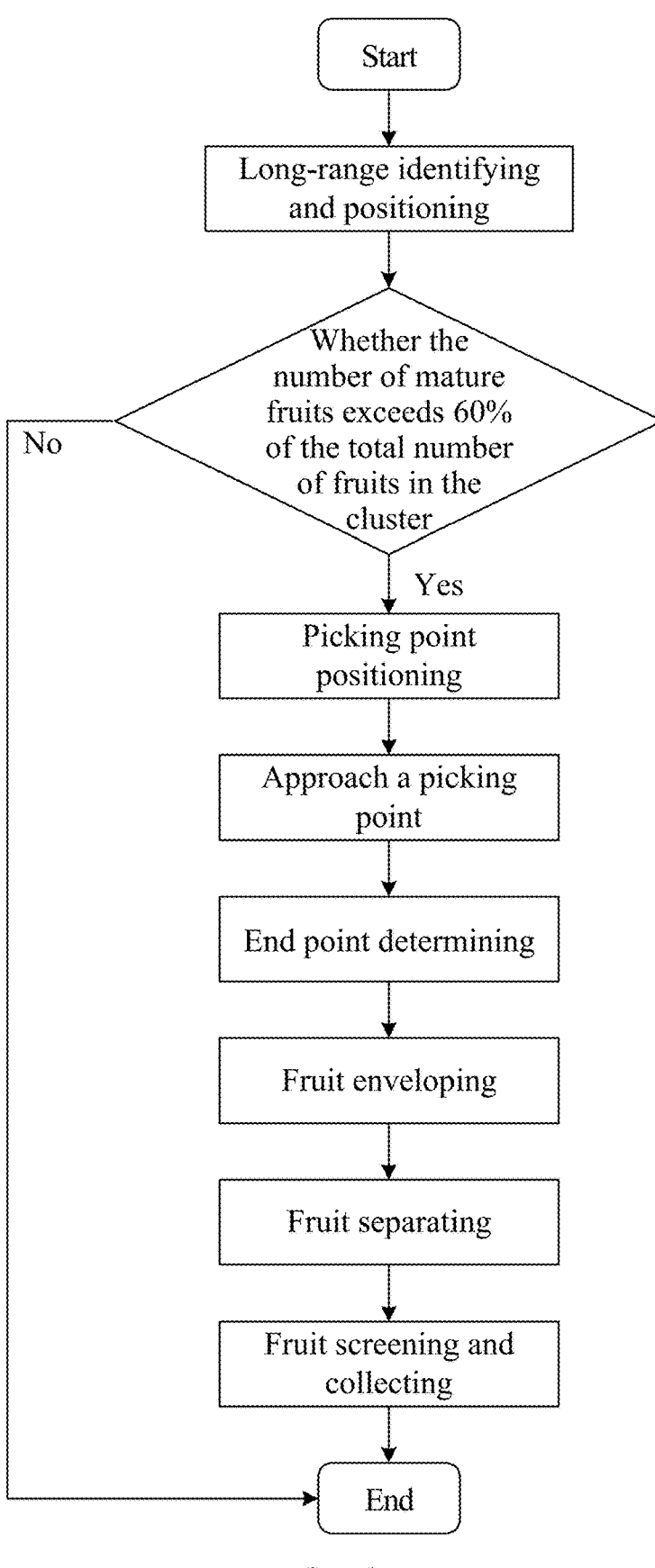
FIG. 6 is a work flow diagram of a picking and grading robot according to an embodiment of the present disclosure.

An end execution mechanism 50 is disposed at an end that is of the picking robotic arm 40 and that is away from the base supporting mechanism 10. The end execution mechanism includes a fixed box body 51, a drive motor 52, a first gear 53, a second gear 54, a first rack 55, a first protective ring 56, a second rack 57, a squeezing plate 58, and a second protective ring 59. The fixed box body 51 is disposed at an end that is of the picking robotic arm 40 and that is away from the base supporting mechanism 10, the drive motor 52 (as shown in FIG. 4) is disposed on a bottom of an inner cavity of the fixed box body 51, a gear shaft 520 is coaxially disposed on an output shaft of the drive motor 52, and an end that is of the gear shaft 520 and that is away from the drive motor 52 is rotatably connected to a top surface of the inner cavity of the fixed box body 51. The first gear 53 and the second gear 54 are sequentially sleeved (fastened) on an outer wall of the gear shaft 520 from bottom to top, an inner wall of one side of the fixed box body 51 is slidably provided with the first rack 55 (as shown in FIG. 5, the first rack 55 is disposed on an upper side of the fixed box body 51 in this embodiment) corresponding to the first gear 53, the first protective ring 56 is disposed at an end that is of the first rack 55 and that is away from the picking robotic arm 40 through a slidable supporting base 562 (an end that is of the slidable supporting base 562 and that is away from the first rack 55, namely, a lower end as shown in FIG. 4 is slidably connected to a corresponding inner wall of the fixed box body 51 to implement stable sliding of the first protective ring 56). An end that is of the first protective ring 56 and that is away from the first rack 55 penetrates and is slidably connected to a corresponding side wall of the fixed box body 51, a separating block 561 is disposed on a top surface of an end (namely, an end part located outside the fixed box body 51) that is of the first protective ring 56 and that is away from the fixed box body 51, and a separating groove (as shown in FIG. 4) with a separating blade is provided in a side surface of one side that is of the separating block 561 and that is close to the fixed box body 51. An inner wall (namely, an inner wall of a side opposite to the first rack 55, for example, a side wall of a lower side of the fixed box body 51 as shown in FIG. 5) of the other side of the fixed box body 51 is slidably provided with the second rack 57 (as shown in FIG. 5, a length of the second rack 57 is greater than that of the first rack 55) corresponding to the second gear 54. An end that is of the second rack 57 and that is close to the first protective ring 56 penetrates a corresponding side wall of the fixed box body 51, and is provided with the squeezing plate 58, and a side surface of a side that is of the squeezing plate 58 and that is close to the separating block 561 is provided with an ejector block 581 corresponding to the separating groove. To ensure smooth cutting of the end execution mechanism 50, a limiting rod 582 (as shown in FIG. 5) is disposed on a side surface of a side that is of the squeezing plate 58 and that is away from the ejector block 581, and is located on a side of the first rack 55. The limiting rod 582 penetrates a corresponding side wall of the fixed box body 51, and a limiting block is disposed on a side that is of the limiting rod 582 and that is away from the squeezing plate 58. An outer wall of the fixed box body 51 is fixedly provided with the second protective ring 59 on a lower side of the first protective ring 56, and the second protective ring 59 and the first protective ring 56 are disposed in parallel. The first protective ring 56 and the second protective ring 59 each include an inner ring and an outer ring, where the inner ring is made of plastic, and the outer ring is made of a biopolymer material (Both the plastic and the biopolymer material are common materials in the field).

The storage mechanism is disposed on an end surface of the base supporting mechanism 10 (specifically, the connecting plate 13), and the storage mechanism is separately connected to the end execution mechanism 50, and the grading and screening mechanism. As shown in FIG. 1, the storage mechanism includes a connecting hose 61, a cushioning mechanism, a transition collecting box 62, and a guide chute 63. The transition collecting box 62 is fixedly disposed on an end surface of the base supporting mechanism 10 (namely, the connecting plate 13) through a bracket and is located on a side of the circular screening disc 31. A distance between a bottom surface of the transition collecting box 62 and the end surface of the base supporting mechanism 10 is greater than a distance between a top surface of the circular screening disc 31 and the end surface of the base supporting mechanism 10 (that is, a height of the transition collecting box 62 is greater than that of the circular screening disc 31, as shown in FIG. 1). One end of the connecting hose 61 is disposed on a bottom surface of the second protective ring 59, and is communicated with an inner ring of the second protective ring 59, the other end of the connecting hose 61 is communicated with a side surface of a side of the transition collecting box 62, and the cushioning mechanism (for example, rubber bosses that are uniformly distributed are configured to perform cushioning or another similar way, which is not specifically limited in this application, and may be set by a person skilled in the art according to an actual condition) is disposed on a joint of the connecting hose 61 and the transition collecting box 62. The guide chute 63 is provided on a side surface of a side that is of the transition collecting box 62 and that is close to the circular screening disc 31, and the guide chute 63 is an inclined chute that is inclined to the circular screening disc 31 from the transition collecting box 62. The bottom surface of the inner cavity of the transition collecting box 62 is set to an inclined surface structure (a degree of inclination of the inclined surface structure is consistent with that of the guide chute 63) that is inclined to the circular screening disc 31 from the transition collecting box 62, and a sponge cushioning layer (to damage to fruit epidermis caused by slippage) is uniformly paved on an inner cavity wall of the transition collecting box 62.

The visual identification system includes one positioning binocular camera 71 and two identifying binocular cameras 72. The positioning binocular camera 71 is disposed on the end execution mechanism 50 (specifically a top surface of the fixed box body 51), and corresponding to the grading and screening mechanism, the identifying binocular cameras 72 corresponding to the grading and screening mechanism are disposed on the end surface of the base supporting mechanism 10 (specifically, the identifying binocular cameras 72 are correspondingly disposed on upper and lower sides of the circular screening disc 31, and the circular screening disc 31 is made of a transparent material, as shown in FIG. 1).

Embodiment 2

As a preferable embodiment of the present disclosure, a picking method using the plum picking and grading robot in Embodiment 1 includes the following steps.

In step S1, identifying and positioning are performed, where scanning is performed by the positioning binocular camera 71 in a horizontal orientation at a long-range point relative to a plum to obtain a distant plum image, and segmentation and target identification are performed on the distant plum image. Details are as follows.

In step S11, first, a histogram of an input image is calculated to obtain frequency distribution of each pixel value in the input image; a target image is sampled, a histogram interval of the target image is divided into M equal subintervals, and a width of each subinterval is set to U; and an image gray value is mapped to each subinterval and a pixel frequency within each subinterval is calculated.

In step S12, first, grayscale distribution of all pixel values within each subinterval is calculated to obtain a grayscale mean within each subinterval, and a within-class variance of each subinterval is calculated, where the within-class variance indicates pixel value dispersion in the subinterval; and all possible thresholds are scanned, a within-class variance corresponding to each threshold is calculated, and a threshold that maximizes a within-class variance is selected as an optimal threshold.

In step S13, an image is divided, according to the optimal threshold, into two regions: a foreground and a background, where a region in which a pixel value is greater than the optimal threshold is the foreground, and a region in which a pixel value is less than the optimal threshold is the background, to segment the target image from the background.

In step S14, the segmented image is optimized by using grayscale morphology (the grayscale morphology is a conventional technology in the field, and is not specifically limited in this embodiment) to implement image segmentation and identification, and subintervals of the segmented image are divided and positioned.

In step S2, a plum cluster is selected, where a target tracking algorithm is adopted to track target plums and a quantity of mature plums is identified. Details are as follows.

In step S21, first, a candidate target is detected from a video frame through target detection, and a bounding box and a confidence score of each candidate target are obtained;

and then detected candidate targets are grouped according to correlation between time and space, and a degree of overlap between two candidate targets is measured.

In step S22, a detected result of a current frame is matched with a trajectory of a previous frame, and a minimal-cost matching method is obtained by using a Hungarian algorithm (a conventional Hungarian algorithm in the field), and calculation is performed based on cost including a distance, a speed, and a confidence, to complete primary matching; and secondary matching is performed between a candidate target that is not matched with a previous trajectory and a trajectory closest to the candidate target.

In step S23, a new trajectory is generated according to a matching result, where each generated trajectory includes a series of bounding boxes and corresponding confidence scores; and a position of a trajectory for a next frame is predicted via a Kalman filter, and the predicted trajectory is corrected according to a new detection result.

In step S24, a confidence score threshold range is preset, the confidence score in the trajectory is compared with the confidence score threshold range to implement separating fruits based on fruit maturity. The confidence score threshold range in this embodiment is [0,1], where a proximity to a lower limit of the confidence score threshold range indicates a higher maturity, and a proximity to an upper limit of the confidence score threshold range indicates a lower maturity (that is, proximity to 0 indicates a higher maturity, and proximity to 1 indicates a lower maturity); and trajectories are screened according to trajectory lengths and confidence scores to remove unstable and unreasonable trajectories, to obtain a quantity of fruits.

When a quantity of mature plums in a cluster exceeds 60% of a total quantity of fruits in the cluster, the cluster is designated as a target plum cluster.

In step S3, picking point positioning is performed, where a position of a bottommost plum of the target plum cluster is selected as a picking point reference position, and downward movement of 3 cm to 5 cm is performed along a bottommost end of the picking point reference position in a longitudinal direction of the bottommost plum, to obtain a picking point.

A method for obtaining the position of the bottommost plum includes the following steps. First, images are obtained from different perspectives through image acquisition in a plurality of perspectives. Then, feature points are extracted from two or more images to search for a feature point pair corresponding to a same target point (namely, the bottommost plum). Then, three-dimensional point cloud is calculated through triangulation for each matched feature point pair, to obtain spatial coordinates of the target point, where a depth d from triangulation is as follows:

$$d = \frac{f \cdot b}{\tan \alpha}$$

Herein, f indicates a camera focal length, b indicates a distance between images in different perspectives, and α indicates an angle between images in different perspectives.

In step S4, fruit picking is performed, where the picking robotic arm 40 is gradually moved according to the picking point (namely, a subregion corresponding to the picking point), to complete further identifying and positioning of the plum at a close range (through the positioning binocular camera 71). Details are as follows.

First, an optimal classification hyperplane is obtained by using a support vector machine (SVM) algorithm, a model is established, and a hyperplane linear equation is defined for dividing sample data into two classes, $$W^T \cdot X + b = 0$$

Herein, w indicates a weight vector; X indicates a hyperplane, where sample data points are perpendicular to the hyperplane X; and b indicates a bias item for determining a distance between the hyperplane and an origin.

Then, the weight vector w and the bias term b of the hyperplane linear equation are obtained by resolving using a Lagrangian multiplier method.

Then, any two variables are selected through iteration to perform optimization, thereby implementing model optimization.

Finally, data is classified by using the weight vector and the bias item, a distance from a data point to the hyperplane is calculated, and the class is determined according to a positive or negative value of the distance, where a classifying linear equation is as follows:

$$f(x) = \text{sign}(W^T \cdot X + b)$$

Herein, predicted class labels within the sign( ) function are −1 or 1.

Pixels in an image are determined by using a decision function, thereby achieving image segmentation and target identification/positioning.

After the end execution mechanism 50 reaches the picking point, a relative distance between the picking point and an upper edge of the plum (namely, an apex of the plum) is obtained, and then the relative distance is longitudinally increased by 3 cm to 5 cm to obtain an end point of the end execution mechanism 50. A method of obtaining the upper edge of the plum (namely, the apex of the plum) includes the following steps.

First, two-dimensional coordinates (u, v) of a corresponding feature point in the image and depth information D of the two-dimensional coordinates are obtained, and three-dimensional coordinates of the feature point is obtained through calculation:

$$\begin{cases} X = \dfrac{(u - c_x) \cdot D}{f_x} \\ Y = \dfrac{(v - c_y) \cdot D}{f_y} \\ Z = D \end{cases}$$

Herein, fx and fy indicate camera focal lengths, and $c_x$ and $c_y$ indicate coordinates of a camera principal point.

The end execution mechanism 50 is moved from bottom to top according to the picking point and the end point, to implement enveloping and cut-through separating of plums, thereby completing picking. Details are as follows: The end execution mechanism 50 is controlled by the picking robotic arm 40 to move from bottom to top, making picked target fruits sequentially pass through the first protective ring 56 and the second protective ring 59 from top to bottom until the end execution mechanism 50 reaches the end point. Then, the drive motor 52 is rotated to drive the first gear 53 and the second rack 54 to rotate through the gear shaft 520. The first protective ring 56 is driven by the first rack 55 to slide toward a left side as shown in FIG. 5, and the squeezing plate 58 is driven by the second rack 56 to slide toward the right side as shown in FIG. 5, to eject fruit stems. The fruit stems are cut off through crossed squeezing effect between the separating blade and the ejector block 581, and the stem-cut fruits are dropped into the circular screening disc 31 through the connecting hose 61, the transition collecting box 62, and the guide chute 63.

In step S5, fruit screening and collecting are performed, where picked fruits are dropped into a grading and screening mechanism from the storage mechanism, sound fruits are separated from defective fruits after screening is performed via the grading and screening mechanism, and the sound fruits and the defective fruits are respectively collected in the sound fruit collecting box 21 and the defective fruit collecting box 22.

A method for screening plums by the grading and screening mechanism includes the following steps.

In step S51, data is collected, where a dataset including various plum images and corresponding labels is collected, where the dataset includes different task labels including fruit size, presence or absence of cracks, presence or absence of damage, presence or absence of stems, and the like.

In step S52, the fruit size is set as a regression problem, with labels representing sizes of plums, where maximum longitudinal and horizontal diameters of fruits are obtained by calculating a minimum bounding rectangle of fruit images, the maximum longitudinal and horizontal diameters are compared with average data (the average data is obtained through massive experimental data) to determine whether the fruit sizes meet standards; the presence or absence of cracks is set as a secondary classification problem with labels: crack-present=1 and crack-absent=0; the presence or absence of damage is set as a secondary classification problem with labels: damage-present=1 and damage-absent=0; and the presence or absence of stems is set as a secondary classification problem with labels: stem-present=1 and stem-absent=0.

In step S53, model design is performed, where a ResNet neural network model is used as a screening model, first four ResNet Blocks of the ResNet neural network model are selected as a shared convolutional layer to extract features of an input image; and a plurality of task-specific branches are set after the shared convolutional layer, where each branch is used to process a specific task, each task-specific branch includes several convolutional layers and a fully connected layer for optimizing different tasks.

In step S54, the screening model is trained by using the dataset including a plurality of task labels, where a corresponding label is provided for each task in a training process.

In step S55, performance of the screening model is evaluated by using a validation set after the screening model is trained, to complete training.

The plums are identified by the identifying binocular camera 72 in the circular screening disc 31 to determine fruit size, presence or absence of cracks, presence or absence of stems, and the like (in this process, the first baffle plate 32 is continuously rotated to: turn the plums, to avoid a detection dead corner; and move the plums to the discharge outlet; and the first baffle plate 32 is made of a transparent material). If the fruits are qualified fruits, the second baffle plate 34 is rotated to close a connection port between the defective fruit slideway 35 and the first slideway 33, making the fruits enter the sound fruit collecting box 21 through the first slideway 33, the sound fruit slideway 36, and the second slideway 37. If the fruits are unqualified fruits, the second baffle plate 34 is rotated to close connection port between the sound fruit slideway 36 and the first slideway 33, making the fruits enter the defective fruit collecting box 22 through the first slideway 33, the defective fruit slideway 36 and the blanking hole 130. In this way, the plums are graded and screened.

What is claimed is:

1. A plum picking and grading robot, comprising: a base supporting mechanism, a collecting box body, a grading and screening mechanism, a picking robotic arm, an end execution mechanism, a storage mechanism, and a visual identification system, wherein the collecting box body is disposed at a front end of the base supporting mechanism, and comprises a sound fruit collecting box and a defective fruit collecting box; the grading and screening mechanism and the picking robotic arm are separately disposed on an end surface of the base supporting mechanism; the end execution mechanism is disposed on an end that is of the picking robotic arm and that is away from the base supporting mechanism; the storage mechanism is disposed on the end surface of the base supporting mechanism, and the storage mechanism is separately connected to the end execution mechanism and the grading and screening mechanism; and the visual identification system comprises one positioning binocular camera and two identifying binocular cameras, wherein the one positioning binocular camera is disposed on the end execution mechanism, and the two identifying binocular cameras corresponding to the grading and screening mechanism are disposed on the end surface of the base supporting mechanism;

wherein the base supporting mechanism comprises a chassis, a plurality of vertical supporting studs, a connecting plate, crawler wheels, and tracks, wherein the plurality of vertical supporting studs that are uniformly distributed are disposed on an end surface of the chassis, an end that is of each of the plurality of vertical supporting studs and that is away from the chassis is connected to the same connecting plate, two crawler wheels are disposed on a side surface of each of two sides of the chassis, and the two crawler wheels on a same side are connected to each other through the track; and the defective fruit collecting box is disposed between the chassis and the connecting plate, and the sound fruit collecting box is disposed at a front end of the chassis, and the sound fruit collecting box is fixedly connected to the defective fruit collecting box;

wherein the grading and screening mechanism comprises a circular screening disc, a first baffle plate, a first slideway, a second baffle plate, a defective fruit slideway, a sound fruit slideway, and a second slideway, wherein the circular screening disc is fixedly disposed on an end surface of the connecting plate, and the circular screening disc is a tapered structure that has a large diameter on an upper part and a small diameter on a lower part; a coaxial rotating shaft is disposed in a middle of the circular screening disc, the first baffle plate is disposed on an outer wall of the rotating shaft, and the first baffle plate is rotated in the circular screening disc through the rotating shaft; a discharge outlet is provided on a side surface that is of the circular screening disc and that is close to the sound fruit collecting box, the first slideway is disposed at the discharge outlet, and the first slideway is an inclined rail structure that is inclined to the sound fruit collecting box from the circular screening disc; an end that is of the first slideway and that is away from the circular screening disc is connected to the sound fruit slideway, and the defective fruit slideway is disposed on a side surface of the end that is of the first slideway and that is away from the circular screening disc, the second baffle plate is rotatably disposed on a joint of the sound fruit slideway and the defective fruit slideway, the connecting plate is provided with a blanking hole on an end that is of the defective fruit slideway and that is away from the first slideway, and the blanking hole corresponds to the defective fruit collecting box; and an end that is of the sound fruit slideway and that is away from the first slideway is connected to the second slideway disposed in the sound fruit collecting box.

2. The plum picking and grading robot according to claim 1, wherein the end execution mechanism comprises a fixed box body, a drive motor, a first gear, a second gear, a first rack, a first protective ring, a second rack, a squeezing plate, and a second protective ring, wherein the fixed box body is disposed at the end that is of the picking robotic arm and that is away from the base supporting mechanism, the drive motor is disposed on a bottom of an inner cavity of the fixed box body, a gear shaft is coaxially disposed on an output shaft of the drive motor, and an end that is of the gear shaft and that is away from the drive motor is rotatably connected to a top surface of the inner cavity of the fixed box body; the first gear and the second gear are sequentially sleeved on an outer wall of the gear shaft from bottom to top, an inner wall of one side of the fixed box body is slidably provided with the first rack corresponding to the first gear, the first protective ring is disposed on an end that is of the first rack and that is away from the picking robotic arm through a slidable supporting base, an end that is of the first protective ring and that is away from the first rack penetrates and is slidably connected to a corresponding side wall of the fixed box body, a separating block is disposed on a top surface of an end that is of the first protective ring and that is away from the fixed box body, and a separating groove with a separating blade is provided in a side surface of a side that is of the separating block and that is close to the fixed box body; an inner wall of the other side of the fixed box body is slidably provided with the second rack corresponding to the second gear, an end that is of the second rack and that is close to the first protective ring penetrates a corresponding side wall of the fixed box body, and is provided with the squeezing plate, and a side wall of a side that is of the squeezing plate and that is close to the separating block is provided with an ejector block corresponding to the separating groove; and an outer wall of the fixed box body is fixedly provided with the second protective ring on a lower side of the first protective ring, and the second protective ring and the first protective ring are disposed in parallel.

3. The plum picking and grading robot according to claim 2, wherein the storage mechanism comprises a connecting hose, a cushioning mechanism, a transition collecting box, and a guide chute, wherein the transition collecting box is fixedly disposed on the end surface of the base supporting mechanism and is located on a side of the circular screening disc, a distance between a bottom surface of the transition collecting box and the end surface of the base supporting mechanism is greater than a distance between a top surface of the circular screening disc and the end surface of the base supporting mechanism, one end of the connecting hose is disposed on a bottom surface of the second protective ring, and is communicated with an inner ring of the second protective ring, the other end of the connecting hose is communicated with a side surface of a side of the transition collecting box, and the cushioning mechanism is disposed on a joint of the connecting hose and the transition collecting box; and the guide chute is provided on a side surface of a side that is of the transition collecting box and that is close to the circular screening disc, and the guide chute is an inclined chute that is inclined to the circular screening disc from the transition collecting box.

4. A picking method of the plum picking and grading robot according claim 1, comprising:
step S1, identifying and positioning: performing scanning by the one positioning binocular camera in a horizontal orientation at a long-range point relative to a plum to obtain a distant plum image, and performing segmentation and target identification on the distant plum image;
step S2, plum cluster selecting: adopting a target tracking algorithm to track target plums and identifying a quantity of mature plums; and when a quantity of mature plums in a cluster exceeds 60% of a total quantity of fruits in the cluster, designating the cluster as a target plum cluster;
S3, picking point positioning: selecting a position of a bottommost plum of the target plum cluster as a picking point reference position, and downward moving, along a bottommost end of the picking point reference position, 3 cm to 5 cm in a longitudinal direction of the bottommost plum, to obtain a picking point;
S4, fruit picking: gradually moving the picking robotic arm according to the picking point, to complete further identifying and positioning of the plum at a close range; after the end execution mechanism reaches the picking point, obtaining a relative distance between the picking point and an upper edge of the plum, and then longitudinally increasing the relative distance by 3 cm to 5 cm, to obtain an end point of the end execution mechanism; and moving, according to the picking point and the end point, the end execution mechanism from bottom to top to implement enveloping and cutting separation of the plum, thereby completing picking; and
S5, fruit screening and collecting: dropping picked fruits into the grading and screening mechanism from the storage mechanism, separating sound fruits from defective fruits after screening via the grading and screening mechanism, and respectively collecting the sound fruits and the defective fruits in the sound fruit collecting box and the defective fruit collecting box.

5. The picking method according to claim 4, wherein the step S1 specifically comprises:
step S11, first, calculating a histogram of an input image to obtain frequency distribution of each pixel value in the input image; sampling a target image, equally dividing a histogram interval of the target image into M equal subintervals, and setting a width of each subinterval to U; and mapping an image gray value to each subinterval and calculating a pixel frequency within each subinterval;
step S12, first, calculating grayscale distribution of all pixel values within each subinterval to obtain a grayscale mean within each subinterval, and calculating a within-class variance of each subinterval, wherein the within-class variance indicates pixel value dispersion in the subinterval; and scanning all possible thresholds, calculating a within-class variance corresponding to each threshold, and selecting a threshold that maximizes a within-class variance as an optimal threshold;

step S13, dividing, according to the optimal threshold, an image into two regions: a foreground and a background, wherein a region in which a pixel value is greater than the optimal threshold is the foreground, and a region in which a pixel value is less than the optimal threshold is the background, to segment the target image from the background; and step S14, optimizing the segmented image by using grayscale morphology to implement image segmentation and identification, and dividing and positioning subintervals of the segmented image.

6. The picking method according to claim 5, wherein the step S2 of adopting a target tracking algorithm to track target plums and identifying a quantity of mature plums specifically comprises:

step S21, first, detecting a candidate target from a video frame through target detection, and obtaining a bounding box and a confidence score of each candidate target; and then grouping, according to correlation between time and space, detected candidate targets, and measuring a degree of overlap between two candidate targets;

step S22, matching a detection result of a current frame with a trajectory of a previous frame, and obtaining a minimal-cost matching method by using a Hungarian algorithm, and performing calculation based on cost comprising a distance, a speed, and a confidence, to complete primary matching; and performing secondary matching between a candidate target that is not matched with a previous trajectory and a trajectory closest to the candidate target;

step S23, generating a new trajectory according to a matching result, wherein each generated trajectory comprises a series of bounding boxes and corresponding confidence scores; and predicting a position of a trajectory for a next frame via a Kalman filter, and correcting the predicted trajectory according to a new detection result; and step S24, presetting a confidence score threshold range, comparing the confidence score in the trajectory with the confidence score threshold range to implement fruit separating based on fruit maturity, wherein a proximity to a lower limit of the confidence score threshold range indicates a higher maturity, and a proximity to an upper limit of the confidence score threshold range indicates a lower maturity; and screening trajectories according to trajectory lengths and confidence scores to remove unstable and unreasonable trajectories, to obtain a quantity of fruits.

7. The picking method according to claim 6, wherein a method of obtaining the position of the bottommost plum in step S3 specifically comprises:

first, obtaining images from different perspectives through image acquisition in a plurality of perspectives; then, extracting feature points from two or more images to search for a feature point pair corresponding to a same target point; and calculating three-dimensional point cloud through triangulation for each matched feature point pair, to obtain spatial coordinates of the target point, wherein a depth d from triangulation is as follows:

$$d = \frac{f \cdot b}{\tan \alpha},$$

wherein f indicates a camera focal length, b indicates a distance between images in different perspectives, and $\alpha$ indicates an angle between images in different perspectives.

8. The picking method according to claim 7, wherein a method of obtaining the upper edge of the plum in step S4 specifically comprises:

first, obtaining two-dimensional coordinates (u, v) of a corresponding feature point in the image and depth information D of the two-dimensional coordinates, and calculating to obtain three-dimensional coordinates of the feature point:

$$\begin{cases} X = \dfrac{(u - c_x) \cdot D}{f_x} \\ Y = \dfrac{(v - c_y) \cdot D}{f_y} \\ Z = D \end{cases},$$

wherein fx and fy indicate camera focal lengths, and $c_x$ and $c_y$ indicate coordinates of a camera principal point.

9. The picking method according to claim 4, wherein the end execution mechanism comprises a fixed box body, a drive motor, a first gear, a second gear, a first rack, a first protective ring, a second rack, a squeezing plate, and a second protective ring, wherein the fixed box body is disposed at the end that is of the picking robotic arm and that is away from the base supporting mechanism, the drive motor is disposed on a bottom of an inner cavity of the fixed box body, a gear shaft is coaxially disposed on an output shaft of the drive motor, and an end that is of the gear shaft and that is away from the drive motor is rotatably connected to a top surface of the inner cavity of the fixed box body; the first gear and the second gear are sequentially sleeved on an outer wall of the gear shaft from bottom to top, an inner wall of one side of the fixed box body is slidably provided with the first rack corresponding to the first gear, the first protective ring is disposed on an end that is of the first rack and that is away from the picking robotic arm through a slidable supporting base, an end that is of the first protective ring and that is away from the first rack penetrates and is slidably connected to a corresponding side wall of the fixed box body, a separating block is disposed on a top surface of an end that is of the first protective ring and that is away from the fixed box body, and a separating groove with a separating blade is provided in a side surface of a side that is of the separating block and that is close to the fixed box body; an inner wall of the other side of the fixed box body is slidably provided with the second rack corresponding to the second gear, an end that is of the second rack and that is close to the first protective ring penetrates a corresponding side wall of the fixed box body, and is provided with the squeezing plate, and a side wall of a side that is of the squeezing plate and that is close to the separating block is provided with an ejector block corresponding to the separating groove; and an outer wall of the fixed box body is fixedly provided with the second protective ring on a lower side of the first protective ring, and the second protective ring and the first protective ring are disposed in parallel.

10. The picking method according to claim 9, wherein the storage mechanism comprises a connecting hose, a cushioning mechanism, a transition collecting box, and a guide chute, wherein the transition collecting box is fixedly disposed on the end surface of the base supporting mechanism and is located on a side of the circular screening disc, a distance between a bottom surface of the transition collecting box and the end surface of the base supporting mechanism is greater than a distance between a top surface of the circular screening disc and the end surface of the base 5 supporting mechanism, one end of the connecting hose is disposed on a bottom surface of the second protective ring, and is communicated with an inner ring of the second protective ring, the other end of the connecting hose is communicated with a side surface of a side of the transition 10 collecting box, and the cushioning mechanism is disposed on a joint of the connecting hose and the transition collecting box; and the guide chute is provided on a side surface of a side that is of the transition collecting box and that is close to the circular screening disc, and the guide chute is an 15 inclined chute that is inclined to the circular screening disc from the transition collecting box.

* * * * *